Figure 8:
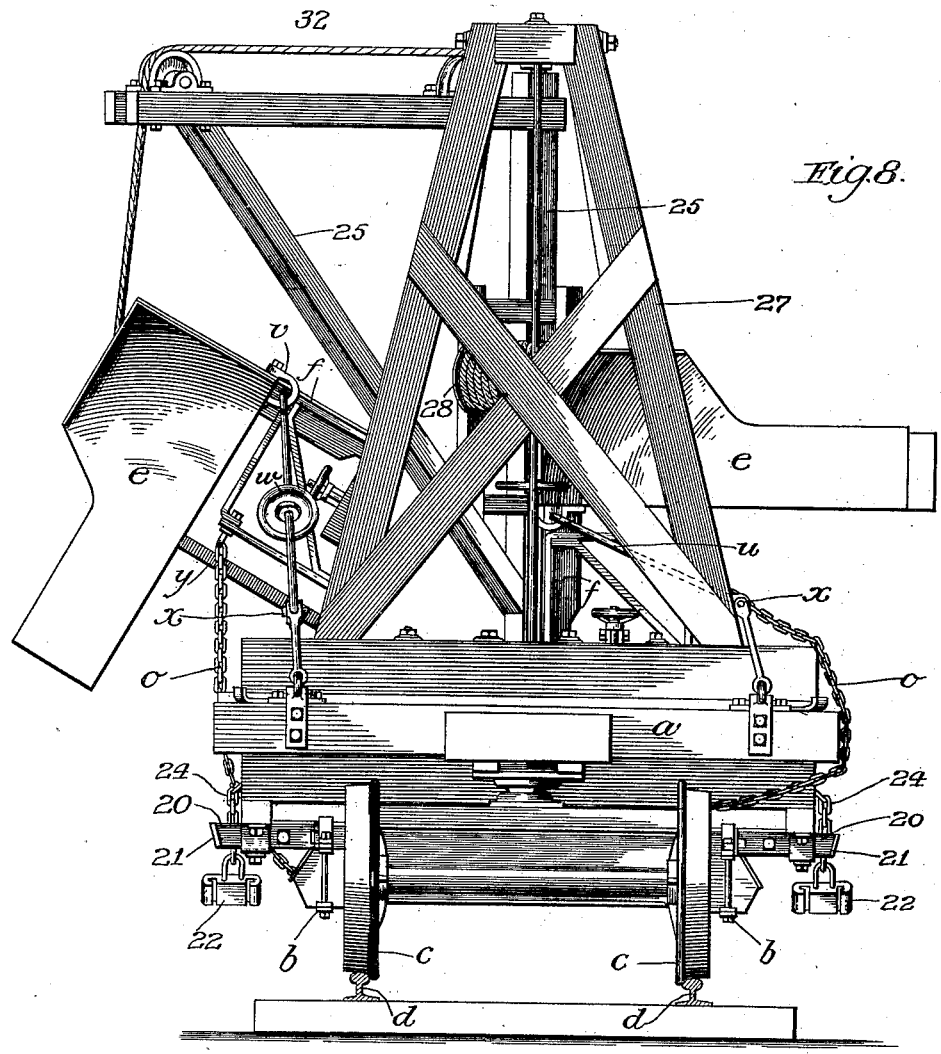

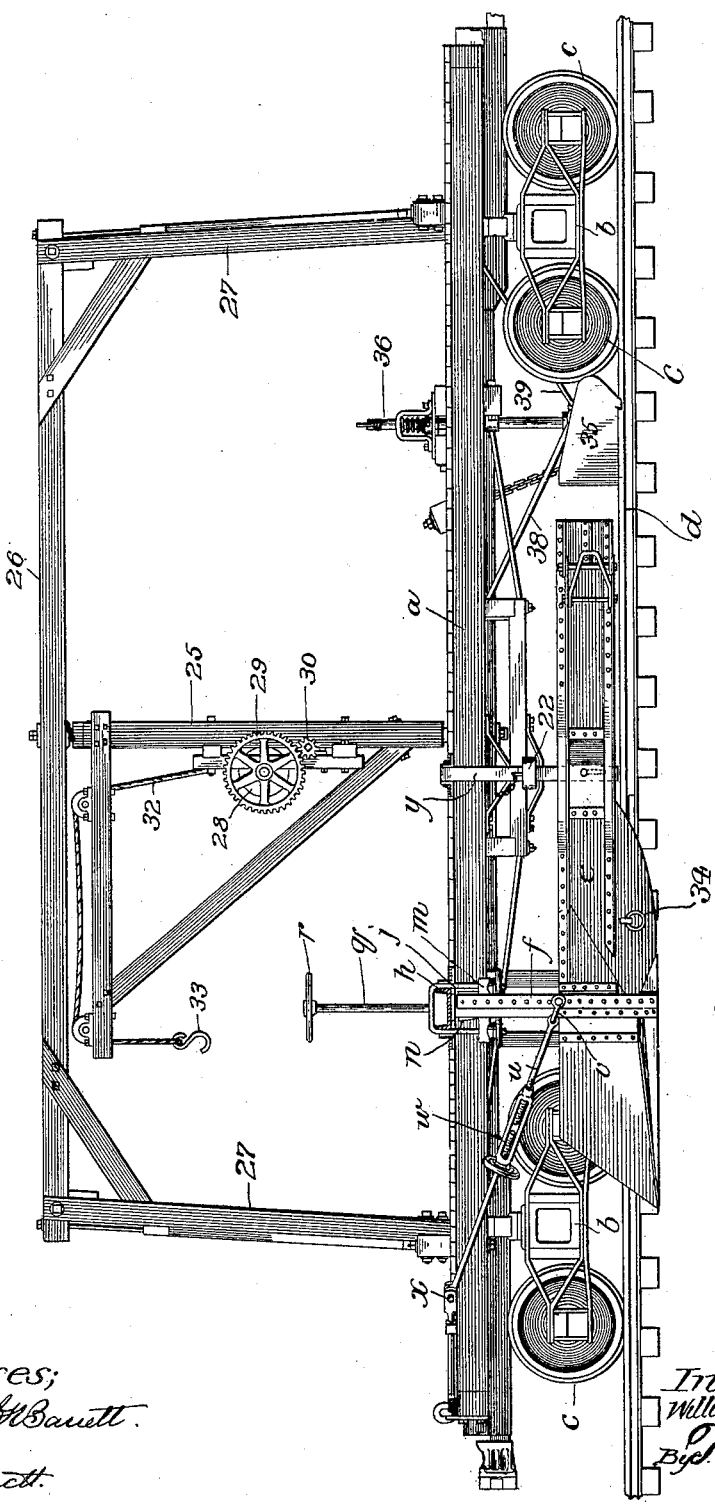

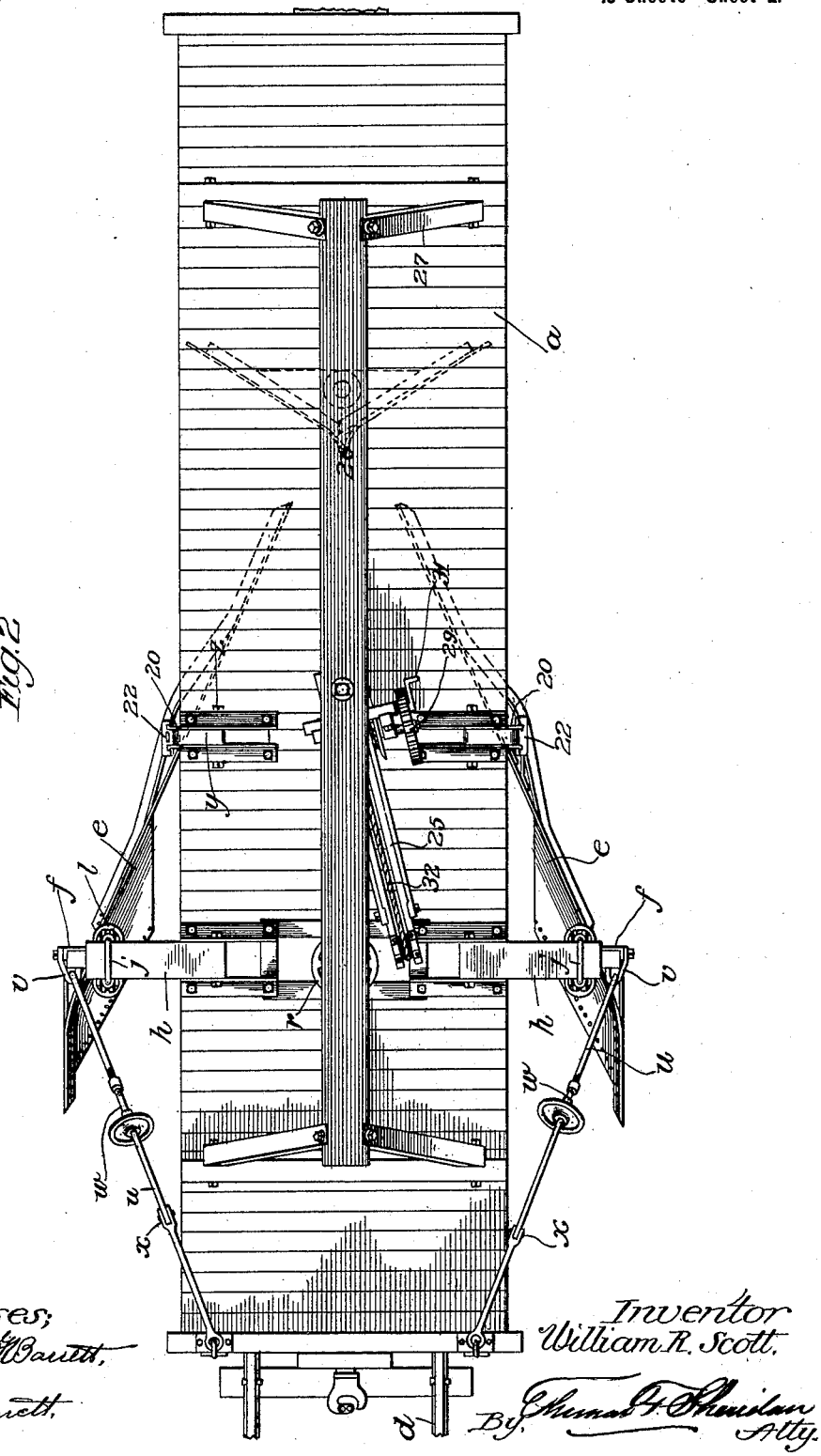

No. 707,649. Patented Aug. 26, 1902.
W. R. SCOTT.
BALLAST SPREADING CAR.
(Application filed Aug. 2, 1901.)
(No Model.) 10 Sheets—Sheet 3.
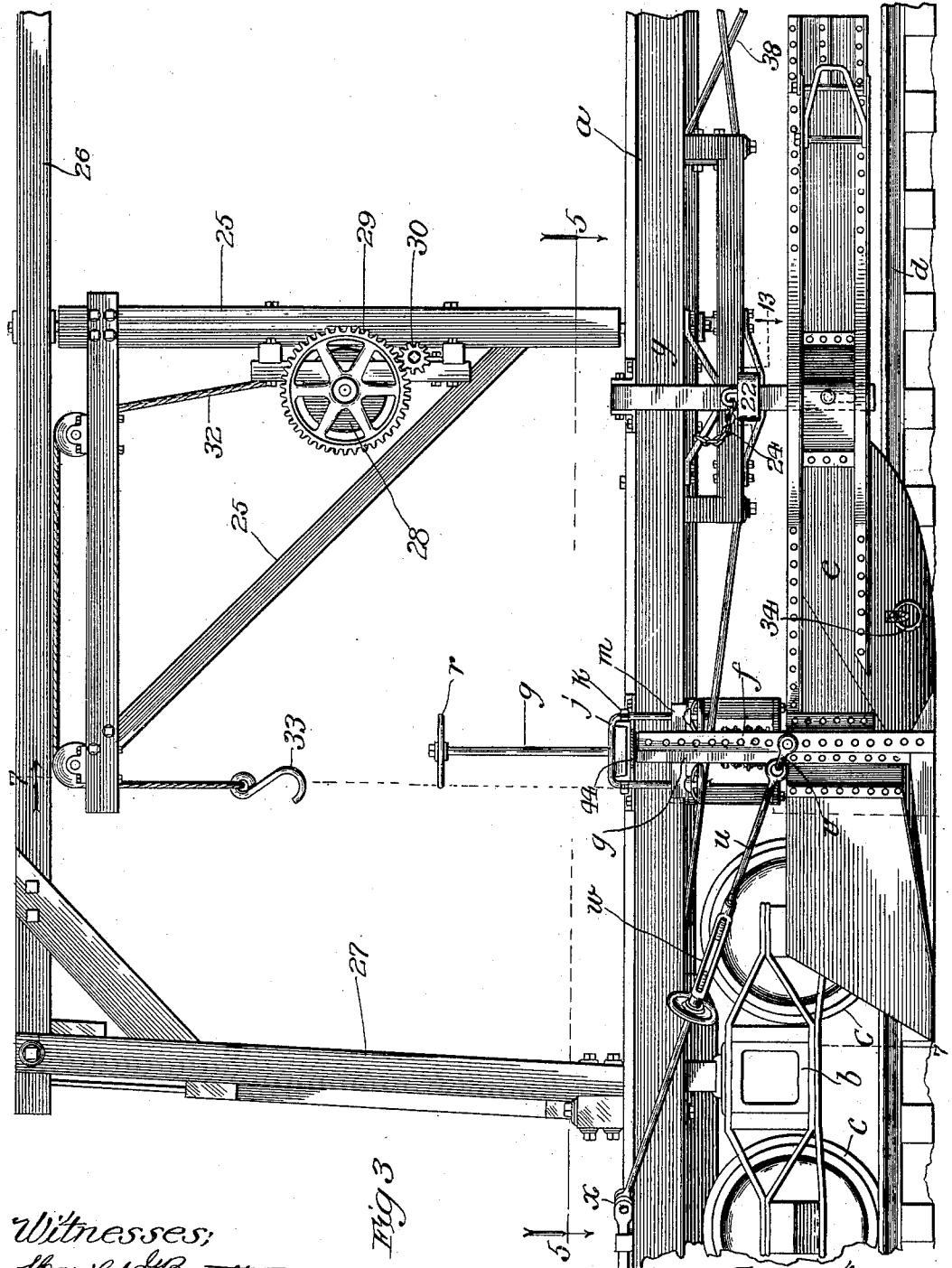

No. 707,649. Patented Aug. 26, 1902.
W. R. SCOTT.
BALLAST SPREADING CAR.
(Application filed Aug. 2, 1901.)
(No Model.) 10 Sheets—Sheet 4.
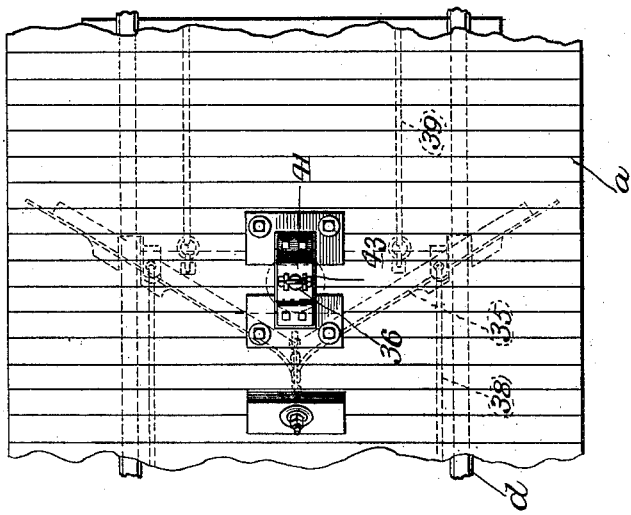
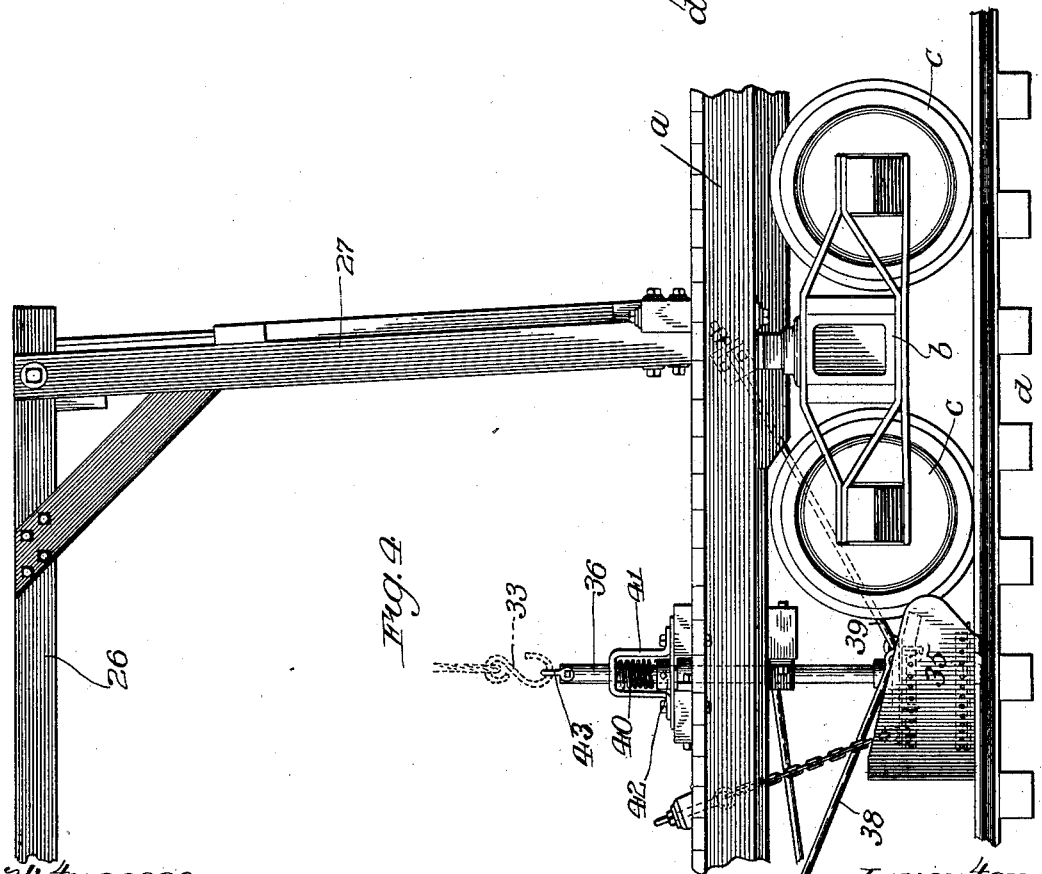
Witnesses:
Harold F. Barrett
Edw. Barrett.
Inventor
William R. Scott.
By Thomas F. Sheridan,
Atty.

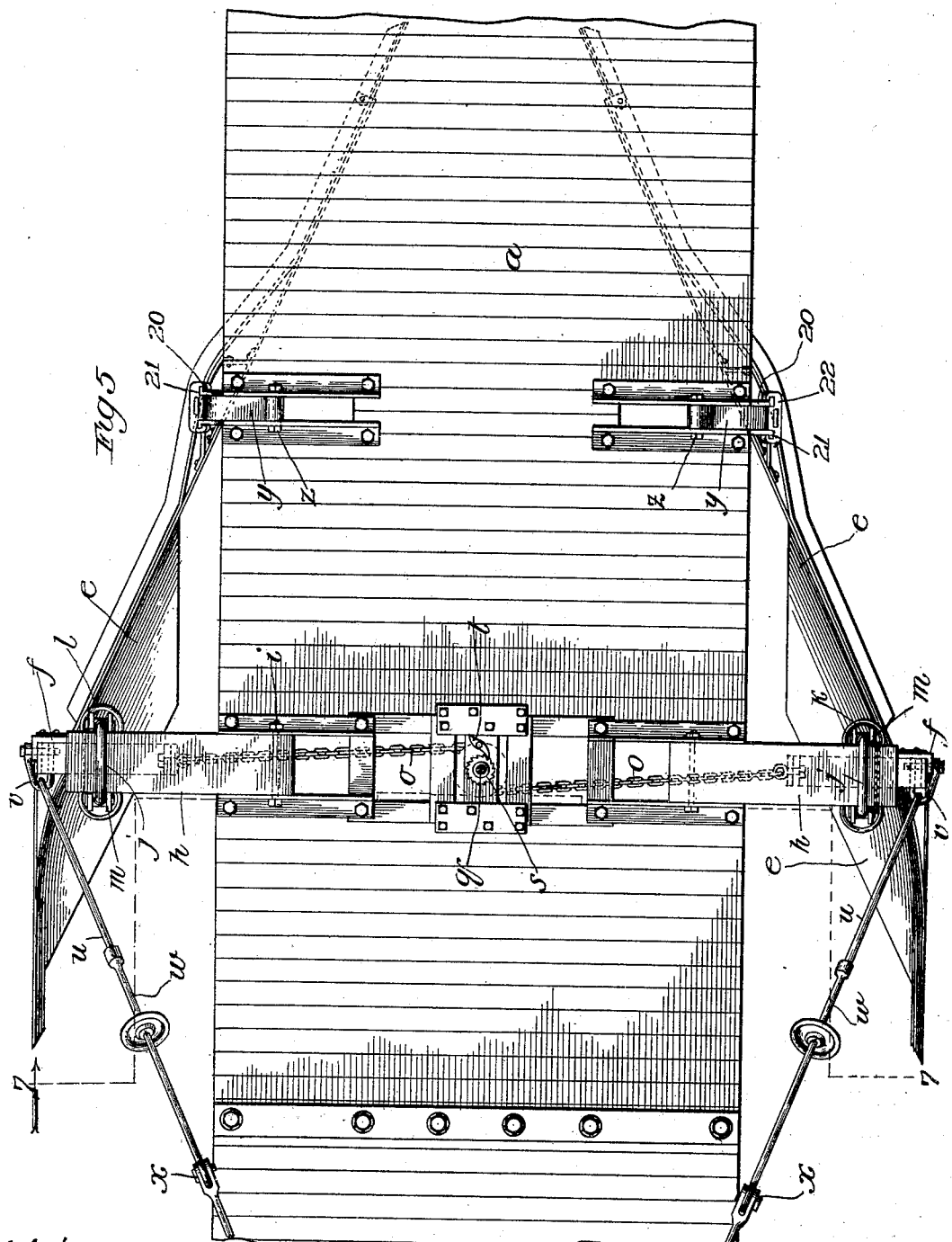

No. 707,649. Patented Aug. 26, 1902.
W. R. SCOTT.
BALLAST SPREADING CAR.
(Application filed Aug. 2, 1901.)
(No Model.) 10 Sheets—Sheet 6.
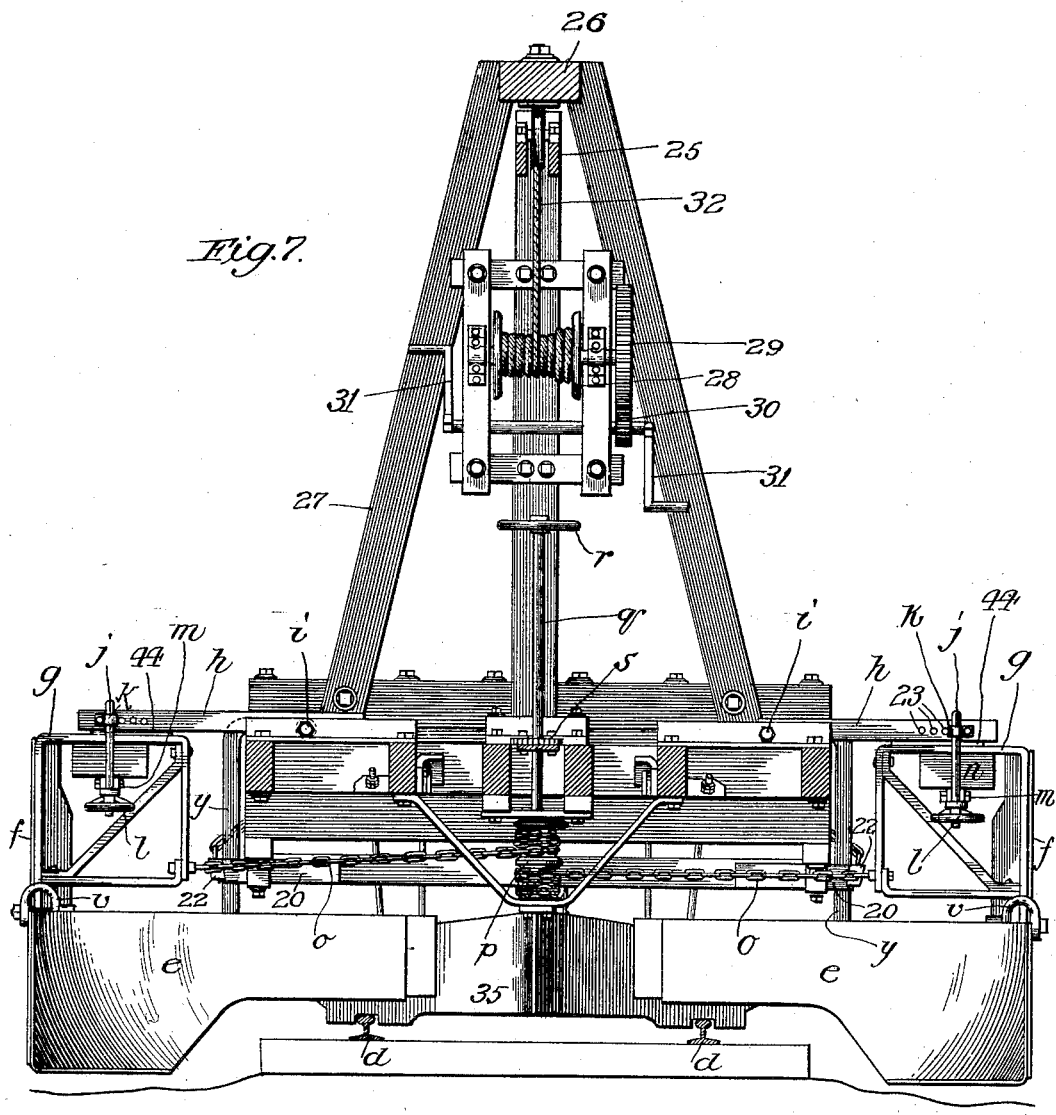

No. 707,649. Patented Aug. 26, 1902.
W. R. SCOTT.
BALLAST SPREADING CAR.
(Application filed Aug. 2, 1901.)
(No Model.) 10 Sheets—Sheet 8.
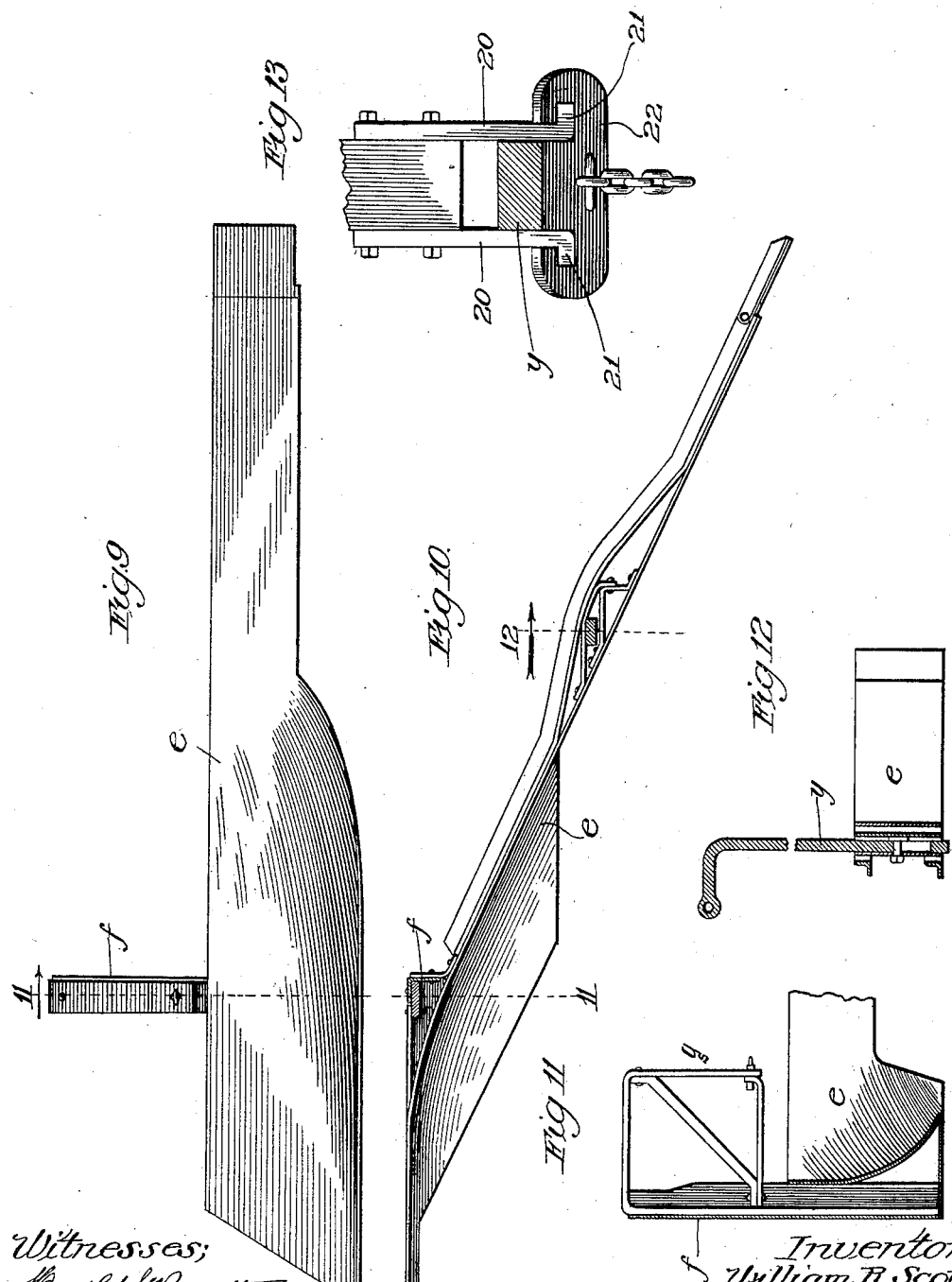

No. 707,649. Patented Aug. 26, 1902.
W. R. SCOTT.
BALLAST SPREADING CAR.
(Application filed Aug. 2, 1901.)
(No Model.) 10 Sheets—Sheet 9.
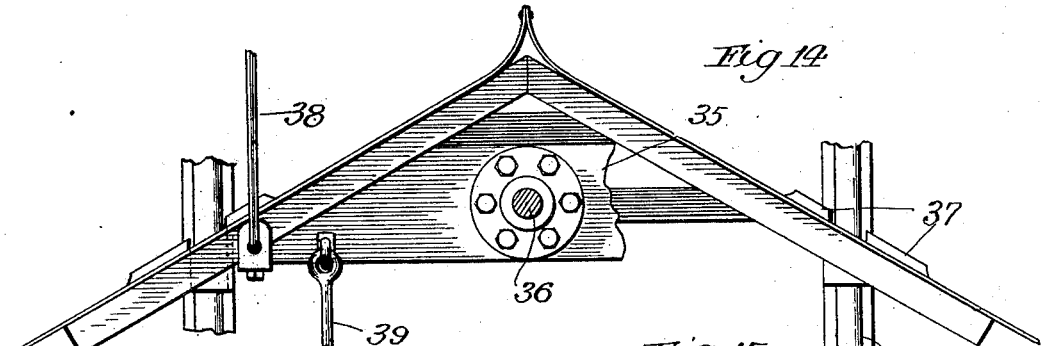
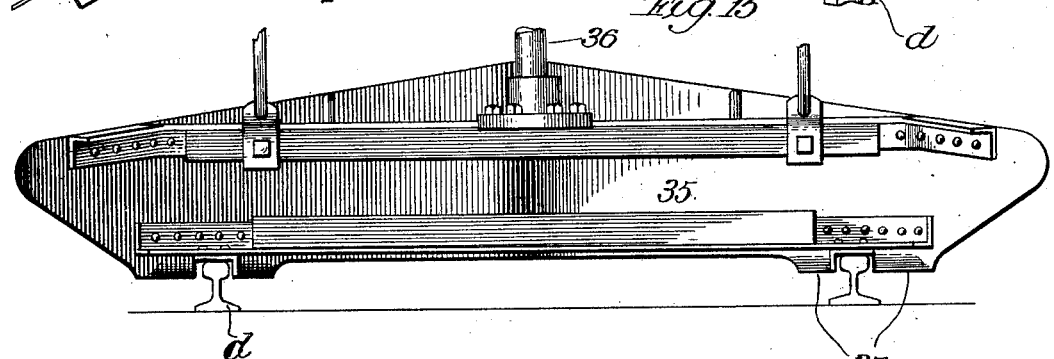
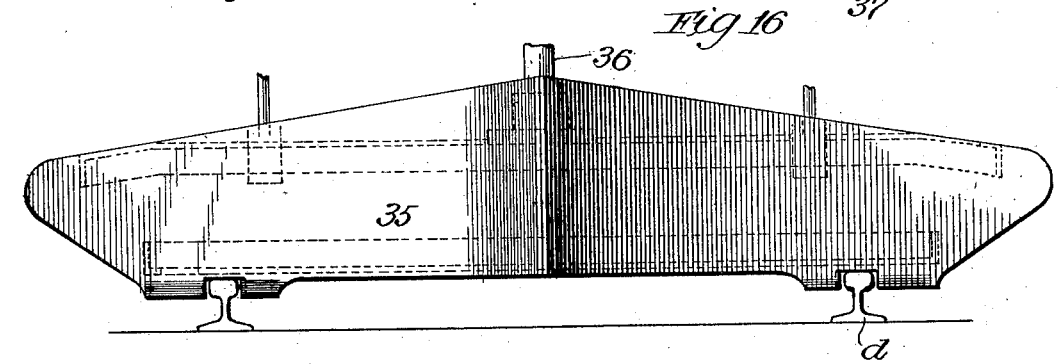
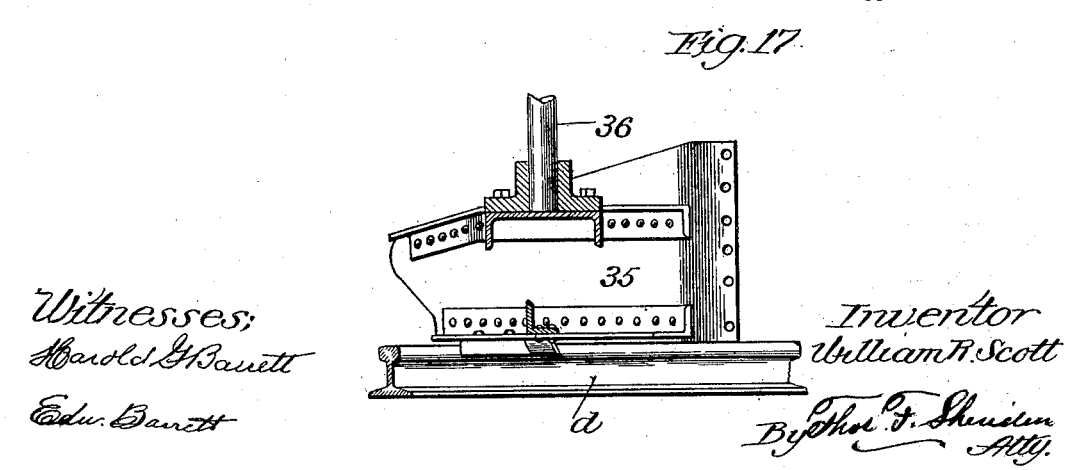
Witnesses:
Harold G. Barrett
Edw. Barrett
Inventor
William R. Scott
By Thos. F. Sheridan
Atty.

No. 707,649. Patented Aug. 26, 1902.
W. R. SCOTT.
BALLAST SPREADING CAR.
(Application filed Aug. 2, 1901.)

(No Model.) 10 Sheets—Sheet 10.

Witnesses:
Harold H. Barrett
Edw. Barrett

Inventor
William R. Scott
By J. F. Sheridan
Atty.

UNITED STATES PATENT OFFICE.

WILLIAM R. SCOTT, OF FORT WORTH, TEXAS.

BALLAST-SPREADING CAR.

SPECIFICATION forming part of Letters Patent No. 707,649, dated August 26, 1902.

Application filed August 2, 1901. Serial No. 70,599. (No model.)

*To all whom it may concern:*

Be it known that I, WILLIAM R. SCOTT, a citizen of the United States, residing at Fort Worth, in the county of Tarrant and State of Texas, have invented certain new and useful Improvements in Ballast-Spreading Cars, of which the following is a specification.

The invention relates to that kind of ballast-spreading cars which are adapted to level, scrape, or plow the ballast over and into final position, and particularly to that class of cars which are arranged to scrape the ballasting material from the embankments at each side of the track toward the center and spread it between the rails and sleepers, all of which will more fully hereinafter appear.

The principal object of the invention is to provide a simple, economical, and efficient ballast-spreading car.
A further object is to provide a ballast-spreader of the class described with scraping and leveling mechanism for moving the ballasting material from the embankment at each side of the tracks over and between the center of the tracks.

A further object is to provide a ballast-spreading car with scrapers, plows, or levelers for moving the material from the outside to the center of the track and foldably arranged thereon so as to be folded or collapsed into an inoperative position and expanded or opened into an operative position.

Further objects will appear from an examination of the drawings and the following description and claims.

The invention consists principally in the combination of a car provided with a set of plows arranged underneath the same and extending from a point outside the tracks to a point inside the tracks to scrape or move ballasting material from the outside into and between the tracks.

The invention consists, further, in the combination of a car, plow mechanism attached thereto below the car and at each side thereof, with the forward ends arranged outside of the supporting-wheels and inclining inwardly and backwardly to a point or points inside of such wheels to move material from the outside of the tracks to the inside over and between the tracks.

The invention consists, further, in the combination of a car provided with plow mechanism attached thereto arranged at each side thereof and extending from a point outside the supporting-wheels and extending backwardly and inwardly to a point inside such wheels and providing an open space between the rear inner ends, with means for foldably securing such mechanism to the car whereby it may be removed from or placed in operative position.

The invention consists, further, in the features, combinations, and details of construction hereinafter described and claimed.

In the accompanying drawings, Figure 1 is a side elevation of a car constructed in accordance with and fitted with my improvements; Fig. 2, a plan view of the same looking at it from above; Fig. 3, an enlarged elevation of one end of the car—that shown to the left in Fig. 1; Fig. 4, a similar view of the opposite end of the car—that shown to the right in Fig. 1; Fig. 5, a sectional plan view of a portion of the car, taken on line 5 5 of Fig. 3, looking in the direction of the arrow; Fig. 6, a plan view of a portion of the mechanism shown in Fig. 4 looking at it from above and forming practically a continuation of the plan view shown in Fig. 5; Fig. 7, a transverse sectional elevation, taken on the irregular lines 7 of Figs. 3 and 5, looking in the direction of the arrow; Fig. 8, a front end elevation of the mechanism shown in Fig. 3, illustrating one of the forward plows as moved back as far as possible from its operative position and the other plow moved partially back into its inoperative position; Fig. 9, a side elevation of one of the forward plows removed from the car; Fig. 10, a plan view of the same looking at it from above; Fig. 11, a sectional elevation, taken on line 11 of Figs. 9 and 10, looking in the direction of the arrow; Fig. 12, a sectional elevation taken on line 12 of Fig. 10; Fig. 13, an enlarged sectional detail of the locking mechanism which holds the forward plows locked in their operative position; Fig. 14, a plan view of the rear plow removed from the car looking at it from above; Fig. 15, a rear elevation of the same; Fig. 16, a front elevation of the rear plow; and Fig. 17, a side elevation of one side of the plow, partly in section, looking at it from the inside and showing a detail of its supporting and pressing mechanisms.

In the art to which this invention relates it is well known that there are several types of cars which carry ballast arranged for discharging the same adjacent to the railroad-tracks, one type a special one which provides for dumping the ballast in piles between the tracks, so that it may be afterward spread economically either by manual labor or specially-designed mechanism. This type of car, however, is a special one and is only adapted, so far as now used, for the carrying of ballast and is not used at any other times. It will be seen, therefore, that a railroad which is equipped with this special type of ballast-car, which can only be used for this purpose and at certain times, means, necessarily, a large and expensive addition to the rolling-stock of such railroad and for which very small returns are received. A second and the most prominent type is the platform or side-dumping car, which dumps the ballast or similar material to each side of the track onto what is called the "embankment." There is no special machinery designed for successfully handling—that is, moving and spreading—the ballast over and between the tracks in such a manner as to prepare it for the jacking-up and tamping of the sleepers which support the tracks. The result is that manual labor has to be entirely depended on for the shoveling of the material over and between the tracks and afterward spreading it into position, all of which consumes considerable time and involves great expense. My invention, therefore, is intended to provide a ballast-spreading car of such construction and arrangement as will take material dumped at either or both sides of the track, move it over and between the tracks, and spread it into such position as will permit of the ties being jacked up or tamped in with the least expenditure of labor and time, all of which will be thoroughly appreciated by those skilled in the art. In illustrating and describing these improvements I have only illustrated and described that which I consider to be new, taken in connection with so much that is old as will properly disclose the invention to others and enable those skilled in the art to practice the same, leaving out of consideration other and well-known elements, which if illustrated and described herein would only tend to confusion, prolixity, and ambiguity.

In constructing my improvements I prefer to provide a car provided with a platform $a$, constructed and arranged in the usual manner of platform-cars and supported and moved upon trucks $b$, having the usual supporting and moving wheels $c$ and other mechanisms which are commonly used in connection with platform-cars, all of which is thoroughly understood by those skilled in the art and needs no further or detailed description here.

Figure 18:
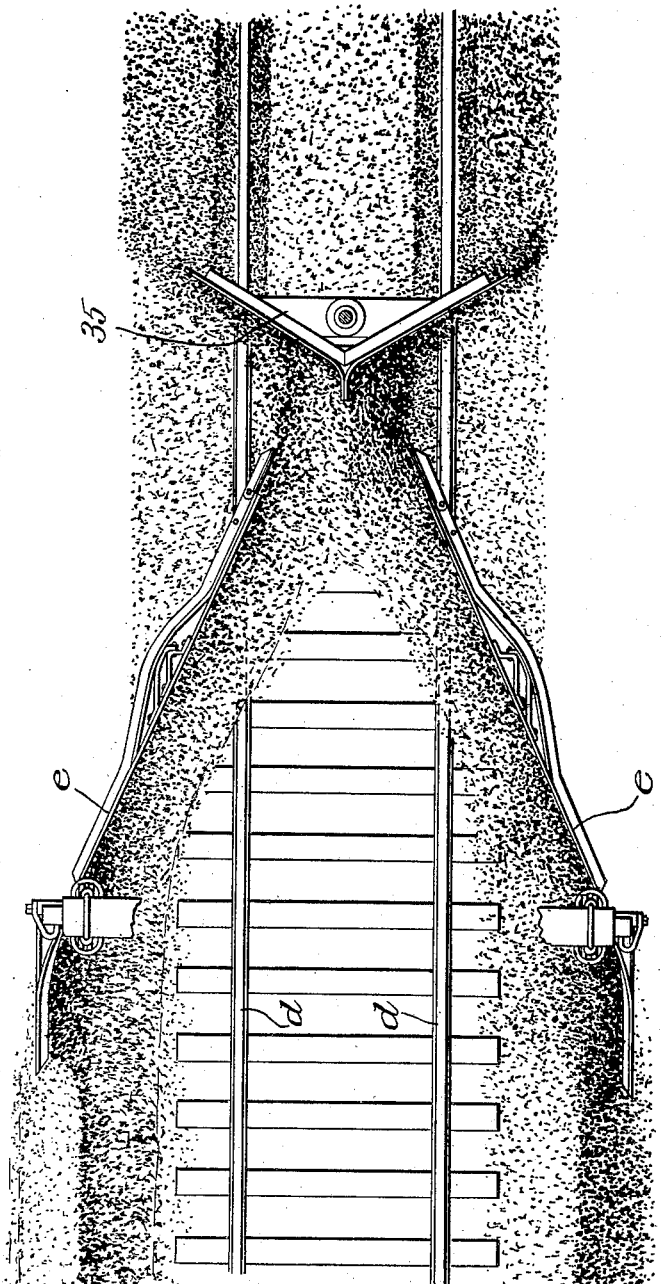

In order to provide means for scraping or moving the ballast from the outside of the track $d$ (see Fig. 18) to a point over and between the tracks and level the same, a pair of scraping-plows $e$ is provided, one at each side of the track and underneath the platform of the car and extending from a point forward of the car and outside the supporting-wheels inwardly and rearwardly to a point between the track, leaving a space, as shown in Fig. 18, between the rear ends thereof. An examination of the drawings will show that as the plows are moved forward in the manner hereinafter described the ballast material is caught up, scraped, and moved inwardly between the track, leveling a portion of the same outside of the track to cover up the ends of the sleepers, while the residue is left in a pile between the tracks to be scraped and leveled in a manner hereinafter described. In Figs. 3, 9, 10, and 11 the construction and shape of the forward plows are clearly shown, and from such figures it will be seen that the forward end of the plow is much wider than the rear end, and its lower edge is curved inwardly, so as to scrape up the material, much like a shovel, and throw it inwardly to a position between the tracks, where the straight, narrow, and rear part of the plow levels a portion of the ballast and continues the further inward movement of the residue. It will be understood by those skilled in the art that it is highly desirable that this plow mechanism be moved out of the way when it is not in use, so that the car may be moved from one point of the road to another without any danger of destroying its efficiency. In order to accomplish this result, each of such plows is provided with upright plow-beams $f$, arranged at the outside thereof, extending upwardly and terminating in rectangular frame portions $g$ at the upper ends thereof. These rectangular frame portions are adjustably secured to beams or arms $h$, which are pivoted to the platform of the car at $i$ (see Fig. 7) and extend outwardly from each side thereof. To adjustably secure these plow-beams to the swinging beams above described, a pair of U-shaped bolts $j$ is provided and passed through clips $k$, detachably secured to the swinging beams and which extend downwardly and are provided at their lower free ends with wheel-nuts $l$, having threaded engagement therewith. These wheel-nuts are arranged to contact straps $m$, extending across the ends of each of the bolts and contacting blocks $n$, interposed between the straps and the rectangular frames of the plow-beams, so as to clamp such beams firmly between them and the outwardly-extending swinging beams. As the strain on this front pair of plows when they are in use extends toward the outside of the car, it becomes desirable to provide means to resist such outward strain. In order to accomplish this result, a pair of chains $o$ is provided, one end of each of which is secured to each plow-beam and the other end passed around a drum $p$. The drum is provided with a vertically-arranged shaft $q$, rotatably mounted in the frame portion of the car, as shown in Fig. 7, and provided with a wheel or handle $r$ at its upper end and also with a ratchet $s$ and pawl $t$, (see Fig. 5,) so constructed and arranged that the operator can wind up the chain to the desired tension and lock the mechanism in such position as to resist the outward strains on the plows.

In order to offset or compensate for the rearward strain on the plows when in use, a pair of stay-rods $u$ is provided, one end of each of which is pivotally secured to the forward end of the car, as shown in Fig. 2, and the other secured to a clevis $v$ on the upright plow-beam, as shown particularly in Figs. 2 and 5. These stay-rods are made in two or more parts hinged together at $x$, one part of which, as shown in Fig. 3, has a turnbuckle $w$, all arranged so as to efficiently support the plows in operative position to resist the rearward strains incident to their use and at the same time permit such plows and their attached mechanisms to be folded upwardly and backwardly out of the way, as will be more fully hereinafter set forth.

As has been hereinbefore described, the mechanisms which hold the plow in use are foldably secured in position, and it becomes desirable, therefore, that some means be provided to lock them in their open or operative position. To accomplish this, the plow is provided with a supplementary L-shaped plow-beam $y$, adjustably secured at its free end to the plow, as shown particularly in Figs. 3, 5, and 12, and at the other end pivotally secured at $z$ to angle-irons on each side of the car. When the parts are in their open, down, and operative position, these supplementary beams $y$ pass between a pair of outwardly-extending arms 20, which in turn are provided at their outside end with projecting lugs 21. (See Figs. 5 and 13.) The supplementary beams are passed between these outwardly-extending lugs, as described, and afterward a slotted locking-plate 22 is dropped into engagement with the lugs on the locking-arms 20, and thus lock the parts in the position shown in Fig. 13.

From the foregoing description of construction and operation and an examination of the drawings it will be seen that the plow and its supporting parts are foldably secured to the platform-car, so that they may be moved upwardly and folded back into inoperative positions and out of the way of passing trains. An examination of Fig. 7 will show that unless some means be provided for moving the plow-beams inwardly the outer edges thereof will be folded backwardly to a point or points beyond the center of the car, and thus interfere with each other. It becomes necessary, therefore, to secure the supporting-beams to the swinging beam in an adjustable manner— that is, that they be permitted to move inwardly the desired amount. In order to accomplish this result, the clips $k$ are secured to the swinging beams $h$, above described, which beams are provided with a plurality of holes 23, so that the securing-bolt of such clips may be removed and the clip, with the U-shaped bolts, moved inwardly. The securing-bolts are then passed through another one of the holes 23, thus permitting the plow-beams to move inwardly, so that the beams and supporting-arms may be swung upwardly and inwardly without any interference, as shown in Fig. 8. When such folding operations are about to take place, the operative releases the ratchet and pawl $s$ and $t$, above described, so as to permit the chain $o$ to also move, and thereby permit the mechanisms to be folded, as above described. It will also be remembered that as a prerequisite to the movement of these parts the locking-plate 22 must be removed from its locking position. These locking-plates are secured to chains 24, one end of which is secured to a cross-beam on the platform of the car, so that they always keep such locking-plates in position for use.

As the plows and their attached mechanisms are very heavy, it will be practically impossible to move them out of or into position unless a large and unnecessary number of operatives are employed. It therefore becomes desirable, and in fact necessary, that mechanism be provided to accomplish this result. In order to provide mechanism by which the plows may be raised from their inoperative position and lowered into their operative position, a crane 25 is provided, the upright post of which is pivoted in the platform of the car at its lower end and in a longitudinal beam 26 at its upper end. This longitudinal beam is supported upon trussed uprights 27, arranged at or near each end of the car. The crane is provided with a winding-drum 28, operated by means of the spur-gear and pinion 29 and 30, the latter by means of the crank-handles 31. The drum is further provided with a cable 32, the free end of which carries a hook 33, arranged to engage with a ring 34 on each end of the plows, so that as the drum is rotated in one position each plow may be alternately moved into or out of position or moved outwardly and held suspended, so as to drop back into operative position, the parts being so constructed and arranged that only two men are necessary to operate the car and handle a large amount of ballast.

It is highly desirable that some means be provided to assist the forward pair of plows in the distribution and complete the leveling of the ballasting material between the tracks. Such plows, however, may be constructed and arranged to handle practically all of the ballast; but for purposes of economy it is desirable that a supplementary plow 35 be provided, arranged at the rear end of the car and supported upon a vertical shaft 36. (See Fig. 4.) This plow, as will be seen from an examination of Fig. 18, takes the remaining material between the tracks, spreads it between such tracks, and levels it into the desired position, and from an examination of Figs. 14, 15, and 16 it will be seen that the downwardly-projecting portions 37, which span each rail, provide a clearance inside and outside of each of the tracks to provide clearance for the car-wheels and flanges thereof, so that the danger of derailing is minimized. This supplementary plow is efficiently held in position by means of the forwardly-extending stay-rods 38 and the rearwardly-extending stay-rods 39, which are secured to the plow, as shown particularly in Fig. 14, and assist it in withstanding the strains and stresses incident to use. A supporting-post 36 for this supplementary plow is provided and yieldingly held in position by means of a tension-spring 40, which is interposed between a strap 41, surrounding the post, and a collar 42 on such post, the spring acting to always hold the plow at its lower limit of motion. The upper end of this post is provided with a clevis 43, pivotally secured thereto, so that when it is desired to move the car the hook 33 on the cable of the crane may be engaged therewith and the crane operated to raise such plow against the pressure of its tension-spring and out of the way, so that the car may be moved from place to place whenever desired.

From the foregoing it will be seen that the pair of forward plows are adjustable as to width and that it often becomes desirable to adjust them up and down to accommodate tracks that are raised and lowered. In such event all that is necessary is to remove the blocks 44, (shown in Fig. 7,) which are arranged between the rectangular frames of the plow-beams and the swinging beams, and place blocks therein of the desired thickness, which of course will regulate or adjust the position of the plows vertically.

As shown in Fig. 18, it will be seen that the ballast in such figure is dumped outside of the tracks at the embankments, so that the forward pair of plows contact such material, scrape, shovel, and throw it over and between the tracks, leveling a portion thereof, the residue between the tracks being operated upon by the supplementary rear plow, which afterward scrapes and levels it into proper position.

There are many advantages incident to a ballast-leveling car constructed in accordance with these improvements, the principal one being that any kind of a car may be used for the carrying and dumping of material outside of the tracks, thereby saving the railroad or contractor the expense of purchasing and maintaining a large number of special cars. A further advantage is that it can be used for raising dirt or for filling bridges and for a variety of purposes. Further, it is very economical in handling ballast and will handle practically any amount of ballast which can be dumped at the embankments and scatter it over and between the tracks, as desired. Further advantages will be seen by those skilled in the art from an examination of the drawings and the foregoing description.

I claim—

1. In a ballast-spreader of the class described, the combination of a car provided with a set of plows arranged underneath in a horizontal plane, one at each side of the car and extending at an angle from a point outside the supporting-wheels rearwardly and inwardly to a point inside the wheels, and foldably secured to the car-frame so that they may be moved outwardly and upwardly above the car, substantially as described.

2. In a ballast-spreader of the class described, the combination of a car provided with a set of movable plows at its forward end arranged underneath the same and in a horizontal plane extending from a point outside the supporting-wheels backwardly and inwardly to a point inside the wheels and providing a space between their rear inner ends, and means for moving the plows outwardly and upwardly above the car-frame, substantially as described.

3. In a ballast-spreader of the class described, the combination of a car, a pair of plows foldably secured thereto and arranged underneath the same and extending from a point outside the supporting-wheels of the car backwardly and inwardly to a point inside the wheels and providing a space between their rear inner ends, and beams pivotally securing the plows to the car-frame so as to swing them outwardly and upwardly above the same, substantially as described.

4. In a ballast-spreader of the class described, the combination of a supporting-car, a pair of plows arranged at the forward end of such car underneath the same extending from a point outside the wheels of the supporting-car backwardly and inwardly to a point inside such supporting-wheels and providing a discharging-space between the rear inner ends of the plows, and a supplementary plow secured to the car underneath the same with its apex arranged back of and substantially in line with the center of the space between the rear ends of the forward pair of plows, substantially as described.

5. In a ballast-spreader of the class described, the combination of a supporting-car, a pair of plows arranged underneath the same and extending from a point outside the wheels of the supporting-car backwardly and inwardly to a point inside of such wheels, outwardly-extending beams or arms pivotally secured to the car, and upright beams on such plows secured to the pivoted swinging beams, for swinging the plows outwardly and upwardly above the car-frame, substantially as described.

6. In a ballast-spreader of the class described, the combination of a supporting-car, a pair of plows arranged underneath the same and extending from a point outside the wheels of the supporting-car backwardly and inwardly to a point inside of such wheels, outwardly-extending beams or arms pivotally secured to the car, and an upright beam on each of such plows adjustably secured to the swinging arms or beams, substantially as described.

7. In a ballast-spreader of the class described, the combination of a supporting-car, a pair of plows arranged underneath the same and extending from a point outside the wheels of the supporting-car backwardly and inwardly to a point inside of such wheels, outwardly-extending beams or arms pivotally secured to the car, an upright beam on each of such plows provided with a rectangular frame portion at the upper part thereof, and means for securing the rectangular frame portion of the plow-beam to the hinged or swinging beams, substantially as described.

8. In a ballast-spreader of the class described, the combination of a supporting-car, a pair of plows arranged underneath the same and extending from a point outside the supporting-wheels of the car backwardly and inwardly to a point inside of such supporting-wheels and providing a discharging-space between their rear inner ends, a pair of swinging arms or beams secured to the frame of the car, an upright plow-beam on each of such plows, means for adjustably securing such upright plow-beams to the swinging beams, and a pair of supplementary plow-beams pivotally secured to the frame of the car to assist in supporting the plows in position, substantially as described.

9. In a ballast-spreader of the class described, the combination of a supporting-car, a pair of plows arranged underneath the same and extending from a point outside the supporting-wheels of the car backwardly and inwardly to a point inside of such supporting-wheels and providing a discharging-space between their rear inner ends, a pair of swinging arms or beams secured to the frame of the car, an upright plow-beam on each of such plows, means for adjustably securing such upright plow-beams to the swinging beams, a pair of supplementary plow-beams pivotally secured to the frame of the car to assist in supporting the plows in position, and means for locking the supplementary plow-beams in operative position, substantially as described.

10. In a ballast-spreader of the class described, the combination of a supporting-car, a pair of plows arranged underneath the same and extending from a point outside the supporting-wheels of the car backwardly and inwardly to a point inside of such supporting-wheels and providing a discharging-space between their rear inner ends, a pair of swinging arms or beams secured to the frame of the car, an upright plow-beam on each of such plows, means for adjustably securing such upright plow-beams to the swinging beams, a pair of supplementary plow-beams pivotally secured to the frame of the car to assist in supporting the plows in position, a pair of outwardly-extending arms in the car-frame adapted to receive the supplementary plow-beams when in operative position, and means for locking the supplementary plow-beams in engagement with the outwardly-extending arms on the car-frame, substantially as described.

11. In a ballast-spreader of the class described, the combination of a supporting-car, a pair of plows arranged underneath the same and extending from a point outside the supporting-wheels of the car backwardly and inwardly to a point inside of such supporting-wheels and providing a discharging-space between their rear inner ends, a pair of swinging arms or beams secured to the frame of the car, an upright plow-beam on each of such plows, means for adjustably securing such upright plow-beams to the swinging beams, a pair of supplementary plow-beams pivotally secured to the frame of the car to assist in supporting the plows in position, a pair of outwardly-extending arms 20 on the car-frame provided with lugs 21 to receive the supplementary plow-beams between them, and a recessed plate 22 for locking the supplementary plow-beams in engagement with the outwardly-extending arms, substantially as described.

12. In a ballast-spreader of the class described, the combination of a supporting-car, a pair of plows arranged underneath the same and extending from a point outside the supporting-wheels thereof backwardly and inwardly to a point inside of such wheels and providing a discharging-space between their rear inner ends, a pair of swinging arms pivotally secured to the car-frame and extending outwardly from each side thereof, plow-beams secured to such swinging arms, by which the plows are swung outwardly and upwardly above the car-frame, a pair of chains—one secured to each plow-beam, and a rotatable drum on which such chains are wound to tighten and loosen the same and hold the plows in proper operative position, substantially as described.

13. In a ballast-spreader of the class described, the combination of a supporting-car, a pair of plows arranged at or near the front portion thereof and extending from points at each side of the car outside of the supporting-wheels thereof backwardly and inwardly underneath the car to a point inside of such wheels and providing a discharging-space between their rear inner ends, a pair of swinging beams pivotally secured to the car-frame and extending out from each side thereof, a plow-beam for each plow adjustably secured to its proper swinging beam, a pair of chains—one for each plow-beam, a drum upon which such chains are wound, a vertically-arranged shaft operating such drum, and pawl-andratchet mechanism for holding the shaft against rotation at the proper time or times, substantially as described.

14. In a ballast-spreader of the class described, the combination of a supporting-car, a pair of plows arranged underneath the same at the forward end thereof extending from points outside the supporting-wheels backwardly and inwardly to points inside of such wheels and providing a discharging-space between their rear inner ends, a pair of swinging beams pivotally secured to the frame of the car and extending outwardly from each side thereof, a plow-beam for each plow provided with rectangular frame portions at their upper ends, and a U-shaped bolt for each swinging beam provided with nut mechanism and adjustably securing each plow-beam to its respective swinging beam, substantially as described.

15. In a ballast-spreader of the class described, the combination of a supporting-car, a pair of plows arranged underneath the same at the forward end thereof extending from points outside the supporting-wheels backwardly and inwardly to points inside of such wheels and providing a discharging-space between their rear inner ends, a pair of swinging beams pivotally secured to the frame of the car and extending outwardly from each side thereof, a plow-beam for each plow provided with rectangular frame portions at their upper ends, a U-shaped bolt for each swinging beam provided with nut mechanism and adjustably securing each plow to its respective swinging beam, and two-part stay-rods hinged together and pivotally secured to the forward end of the car extending backwardly and outwardly and pivotally secured to each plow, respectively, substantially as described.

16. In a ballast-spreader of the class described, the combination of a supporting-car, a pair of plows arranged underneath the same at the forward end thereof extending from points outside the supporting-wheels backwardly and inwardly to points inside of such wheels and providing a discharging-space between their rear inner ends, a pair of swinging beams pivotally secured to the frame of the car and extending outwardly from each side thereof, a plow-beam for each plow provided with rectangular frame portions at their upper ends, a U-shaped bolt for each swinging beam provided with nut mechanism and adjustably securing each plow-beam to its respective swinging beam, and a two-part stay-rod hinged together and provided with a turnbuckle for each plow pivotally secured thereto and to the car-frame, substantially as described.

17. In a ballast-spreader of the class described, the combination of a supporting-car, a pair of plows arranged underneath the same at the forward end thereof extending from points outside the supporting-wheels backwardly and inwardly to points inside of such wheels and providing a discharging-space between their rear inner ends, a pair of swinging beams pivotally secured to the frame of the car and extending outwardly from each side thereof, a plow-beam for each plow provided with rectangular frame portions at their upper ends, a U-shaped bolt for each swinging beam provided with nut mechanism and adjustably securing each plow to its respective swinging beam, two-part stay-rods hinged together and pivotally secured to the forward end of the car extending backwardly and outwardly and pivotally secured to each plow, respectively, supplementary plow-beams adjustably secured to each plow and pivotally secured to the car-frame, and means for locking such supplementary plow-beams at their downward limit of motion and operative position, substantially as described.

18. In a ballast-spreader of the class described, the combination of a supporting-car, a pair of plows arranged underneath the same at the forward end thereof extending from points outside the supporting-wheels backwardly and inwardly to points inside of such wheels and providing a discharging-space between their rear inner ends, a pair of swinging beams pivotally secured to the frame of the car and extending outwardly from each side thereof, a plow-beam for each plow provided with rectangular frame portions at their upper ends, a U-shaped bolt for each swinging beam provided with nut mechanism and adjustably securing each plow-beam frame to its respective swinging beam, two-part stay-rods hinged together and pivotally secured to the forward end of the car extending backwardly and outwardly and pivotally secured to each plow, respectively, supplementary plow-beams adjustably secured to each plow and pivotally secured to the car-frame, means for locking such supplementary plow-beams at their downward limit of motion and operative position, a supplementary plow in the rear of the first-named plows having its apex substantially in line with the central portion of the discharging-space between such plows and underneath the car, a post on which such supplementary plow is mounted extending up through the car, and spring mechanism for holding such post at its downward limit of motion, substantially as described.

19. In a ballast-spreader of the class described, the combination of a supporting-car, a pair of plows arranged underneath the same at the forward end thereof extending from points outside the supporting-wheels backwardly and inwardly to points inside of such wheels and providing a discharging-space between their rear inner ends, a pair of swinging beams pivotally secured to the frame of the car and extending outwardly from each side thereof, a plow-beam for each plow provided with rectangular frame portions at their upper ends, a U-shaped bolt for each swinging beam provided with nut mechanism and adjustably securing each plow-beam frame to its respective swinging beam, two-part stay-rods hinged together and pivotally secured to the forward end of the car extending backwardly and outwardly and pivotally secured to each plow, respectively, supplementary plow-beams adjustably secured to each plow and pivotally secured to the car-frame, means for locking such supplementary plow-beams at their downward limit of motion and operative position, a supplementary plow in the rear of the first-named plows having its apex substantially in line with the central portion of the discharging-space between such plows and underneath the car, a post on which such supplementary plow is mounted extending up through the car, spring mechanism for holding such post at its downward limit of motion, and crane mechanism pivotally mounted on such car and provided with the usual winding-drum, rope and hook for raising and lowering the plows out of and into position, substantially as described.

20. In a ballast-spreader of the class described, the combination of a supporting-car, a pair of plows arranged underneath the same at the forward end thereof extending from points outside the supporting-wheels of the car backwardly and inwardly to points inside of such wheels, means for foldably securing such plows to the car, whereby they may be moved upwardly and inwardly to be carried thereby, chain and stay-rod mechanism to assist such plows in resisting the strains incident to work, a supplementary plow arranged underneath the car in the rear of the forward pair of plows to complete the spreading of the ballast, a vertically-arranged post upon which such supplementary plow is mounted movably mounted in the platform of the car and extending up therefrom, spring mechanism for holding such post and its plow at the downward limit of motion, stay-rod mechanism for such plow to assist it in resisting the strains incident to use, and a clip or similar element secured to the movable post by which the post and plow may be raised out of operative position, substantially as described.

21. In a ballast-spreader of the class described, the combination of a supporting-car, a pair of plows arranged underneath the same at the forward end thereof extending from points outside the supporting-wheels of the car backwardly and inwardly to points inside of such wheels, means for foldably securing such plows to the car, whereby they may be moved upwardly and inwardly to be carried thereby, chain and stay-rod mechanism to assist such plows in resisting the strains incident to work, a supplementary plow arranged underneath the car in the rear of the forward pair of plows to complete the spreading of the ballast, a vertically-arranged post upon which such supplementary plow is mounted movably mounted in the platform of the car and extending up therefrom, spring mechanism for holding such post and its plow at the downward limit of motion, stay-rod mechanism for such plow to assist it in resisting the strains incident to use, a clip or similar element secured to the movable post by which the post and plow may be raised out of operative position, a longitudinally-arranged beam above the platform of the car and supported at or near each end of such car, and a crane having its vertical post pivotally mounted in the platform of the car and in the longitudinal beam to raise and lower the plow mechanisms out of and into operative position, substantially as described.

WILLIAM R. SCOTT.

Witnesses:
GEO. E. THORNE,
J. P. STOUTEMYER.